US006817242B1

(12) United States Patent
Moran (10) Patent No.: US 6,817,242 B1
(45) Date of Patent: Nov. 16, 2004

(54) CONCRETE LEVEL INDICATOR

(76) Inventor: Stephen M. Moran, 2631 NE. 10th Ave., Pompano Beach, FL (US) 33064

( * ) Notice: Subject to any disclaimer, the term of this patent is extended or adjusted under 35 U.S.C. 154(b) by 0 days.

(21) Appl. No.: 10/703,254

(22) Filed: Nov. 7, 2003

(51) Int. Cl.[7] .......................... E01C 23/02; E01C 11/16; G01F 23/60; G01F 23/56
(52) U.S. Cl. ............................ 73/313; 73/319; 404/88; 404/100
(58) Field of Search .......................... 73/313, 319, 322; 404/88, 100, 101, 102, 72, 75, 83, 85

(56) References Cited

U.S. PATENT DOCUMENTS 5,135,333 A  *  8/1992  Guntert et al. .............. 404/100

* cited by examiner

Primary Examiner—Hezron Williams
Assistant Examiner—Tamiko Bellamy
(74) Attorney, Agent, or Firm—Robert M. Downey, PA (57) ABSTRACT

A device indicates the level of concrete within the hopper of a concrete pump and prevent accidental overflow and spills. The concrete level indicator device includes an elongate post with an enlarge float fixed to the bottom end and a guide sleeve for allowing vertical telescoping movement of the post as the concrete level in this hopper changes. A retaining collar attaches to a screen in the hopper of the pump and surrounds the guide sleeve for limiting swinging movement of the post and guide sleeve, thereby maintaining the device in a vertical position within the hopper with the float resting on the concrete. As concrete is filled into the hopper, the post rises through the guide sleeve until a visual indicator (e.g. a red band) on the top end of the post is visibly exposed above the guide sleeve, thereby alerting the operator to interrupt the discharge of concrete being filled in the hopper until the concrete level drops and the visible indicator on the post is no longer visible.

20 Claims, 5 Drawing Sheets

CONCRETE LEVEL INDICATOR

BACKGROUND OF THE INVENTION

1. Field of the Invention

The subject invention relates generally to float operated level indicator devices and, more particularly, to a concrete level indicator float device for indicating the level of concrete being filled in the hopper of a concrete pump in order to prevent accidental overflow and spillage.

2. Discussion of the Related Art

In the construction industry, concrete mixer trucks are used to mix and deliver tons of concrete to all types of projects at commercial and residential construction sites. The well known concrete mixer truck includes a cab for the operator to drive the vehicle, an air supply, a mixing drum, frames to support the mixing drum, a charge hopper, a discharge hopper, an extendable delivery chute and controls for operating the mixing drum and hoppers. Most mixer trucks are provided with a first set of controls inside the cab and a second set of controls at the rear of the vehicle, near the discharge hopper. Either set of controls can be used to operate the discharge hopper in order to selectively start and interrupt the discharge of concrete therefrom. Normally, the delivery chute is attached to the discharge hopper for directing the flow of discharged concrete to a desired location. In many instances, however, the site where the concrete is needed for construction is not within reach of the mixer truck and delivery chute. In this situation, which is typical at many construction sites, a concrete pump is used for moving the loose concrete mixture from the mixer truck discharge site to a pour site where a concrete structure is being formed, such as a deck, floor slab, support column, or wall.

A typical concrete pump used at many construction sites includes a hopper for receiving the loose concrete mixture which is discharged from the mixer truck. Concrete pumps are commonly mounted on a trailer and have hoppers ranging in holding capacity of between 8–12 cubic feet. The hopper is open at the top and may be fitted with one or two screens for separating rocks and other large chunks of material from the concrete mixture as the concrete mixture is being filled through the open top of the hopper. The separator screens in the hopper resemble a grill and have parallel bars which are spaced apart to define a screen size such that objects larger than the spacing between the bars are prevented from passing through the screen. Depending upon the type of concrete structure being formed and the size of the hose being used to transport the concrete, either one or two screens of different size may be used.

In many instances, the operator of the mixer truck may choose to remain in the airconditioned or heated cab while operating the controls which discharge the concrete from the mixing drum of the truck and into the hopper of the concrete pump. And, while this manner of operation is often preferable to the truck operator, it can be particularly troublesome to the concrete pump operator. Because the demand for concrete being moved by the concrete pump is rarely the same as the rate of concrete discharge being filled in the hopper, it is usually necessary to frequently interrupt concrete discharge from the mixing truck until the level in the pump hopper is lowered. When in the cab, the mixer truck operator is unable to see the level of concrete in the pump hopper and relies on signals from the pump operator to start and interrupt discharge. On occasion, the mixer truck operator may fail to react to the signals of the pump operator when the pump hopper is full and the discharge of concrete from the mixer truck continues to flow. Eventually, the concrete mixture will overflow the pump hopper and spill down the outer sides of the concrete pump apparatus and onto the ground. Accidental spills of this nature subject the pump operator to a time consuming and costly cleanup process and may result in damage to the concrete pump apparatus and trailer.

Accordingly, there remains an urgent need in the construction industry, and particularly in the field of concrete construction, for a device which indicates the level of concrete in the hopper of a concrete pump. More particularly, there is a need for a concrete level indicator device which will help to avoid accidental overflow and spillage of concrete being filled in the hopper of a concrete pump.

Object and Advantages of the Invention

With the foregoing in mind, it is primary object of the present invention to provide a concrete level indicator for use on concrete pumps to indicate the level of concrete being filled within the hopper of the pump, and thereby preventing accidental overflow and spillage of concrete.

It is a further object of the present invention to provide a concrete level indicator device which helps to avoid overflow and spillage of concrete being filled in the hopper of a concrete pump, thereby preventing time consuming and costly cleanup of the concrete pump, as well as preventing potential damage to the concrete pump.

It is still a further object of the present invention to provide a concrete level indicator for indicating the level of concrete being filled in the hopper of a concrete pump, and wherein the device is structured to have an entirely mechanical operation with few moving parts.

It is still a further object of the present invention to provide a concrete level indicator for indicating the level of concrete being filled in the hopper of a concrete pump, and wherein the device is constructed of durable, non-corrosive materials.

It is still a further object of the present invention to provide a concrete level indicator for indicating the level of concrete being filled in the hopper of a concrete pump, and wherein the device is easy to clean after each use.

It is still a further object of the present invention to provide a highly durable, low maintenance concrete level indicator device for use on concrete pumps, and wherein the device is easy to assemble, install and operate.

It is yet a further object of the present invention to provide a concrete level indicator device having all of the advantages as set forth above, and wherein the device is relatively easy to manufacture, of low cost and affordable to all of those having a need for the device.

These and other objects and advantages of the present invention are more readily apparent with reference to the detailed description of the invention and accompanying drawings.

SUMMARY OF THE INVENTION

The present invention is directed to a device for indicating the level of concrete within the hopper of a concrete pump and includes an elongate post with an enlarged float fixed to the bottom end. The float sits on the top of the concrete in the hopper and a guide sleeve surrounding the post allows vertical telescoping movement of the post as the level of concrete changes. A retaining collar attaches to a screen in the hopper of the pump and surrounds the guide sleeve. The retaining collar limits swinging movement of the post and guide sleeve, thereby maintaining the device in a vertical position within the hopper. As concrete is filled into the hopper, the post rises through the guide sleeve until a visual indicator (e.g. a red band) on the top end of the post is visibly exposed above the guide sleeve, thereby alerting the operator to stop the discharge of concrete being filled in the hopper until the concrete level drops and the visible indicator on the post is no longer visible.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENTS

Figure 1:
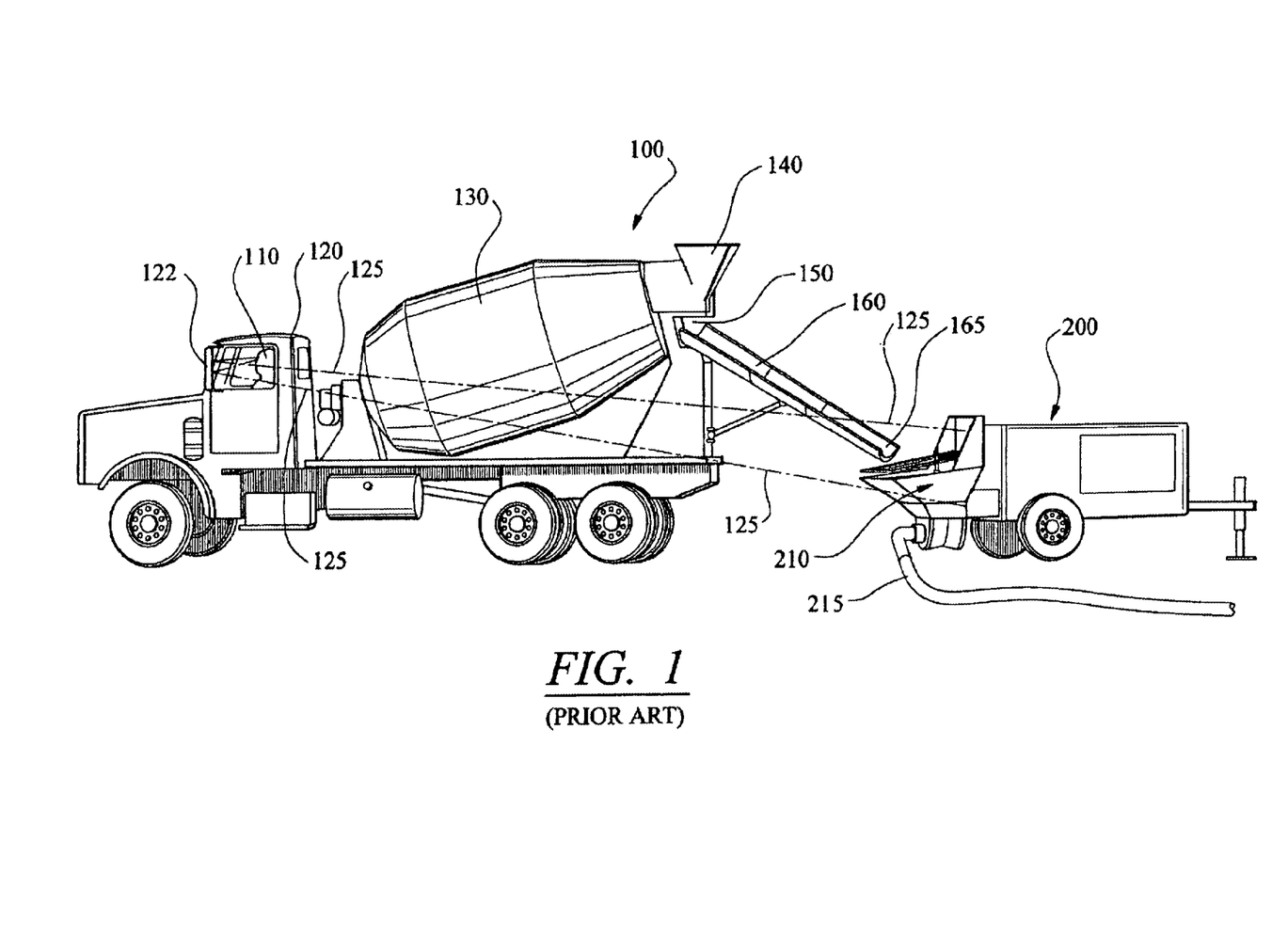
FIG. 1 is a perspective view showing a typical trailer-mounted concrete pump and concrete mixer truck positioned for discharging a loose concrete mixture into the hopper of the concrete pump while the operator of the truck is seated in the cab and viewing the discharge operation and pump hopper through a side view mirror, and wherein the operator's line of sight is indicated in broken lines.

Referring initially to FIG. 1, a conventional concrete mixer truck 100 is shown in position to discharge a loose concrete mixture into the hopper 210 of a typical trailer-mounted concrete pump 200. From the hopper 210, the concrete mixture is pumped through a hose 215 for use in forming a concrete structure at a location which is beyond the reach of the truck 100. In this illustration, the operator 110 of the mixer truck 100 is seated inside of the cab 120 of the truck. The operator 110 can operate the controls within the cab for controlling the concrete discharge into the hopper 210 while viewing the open top of the hopper 210 in the side view mirror of the vehicle, as indicated by the broken lines 125. As shown, the conventional mixer truck includes a mixing drum 130, a charge hopper 140, a discharge hopper 150, and an extendable and movable delivery chute 160. In this instance, the delivery chute is directed downwardly from the discharge hopper 150 so that a lower end 165 of the delivery chute 160 is positioned just above the open top of the hopper 210. The operator 110 can then operate the controls to start and interrupt the discharge of loose concrete mixture down the chute and into the hopper. In normal operation, the level of concrete within the hopper will naturally fluctuate as concrete is pumped from the hopper and through the hose while concrete is being discharged from the truck to replenish the charge of concrete in the hopper. Because the rate of transfer of concrete from the pump hopper 210 and through the hose 215, as demanded at the pour site, is not consistent with the rate of discharge of concrete from the discharge hopper 150 of the truck 100, the operators of the truck and concrete pump are required to maintain a watchful eye on the level of concrete in the pump hopper 210 to ensure that the concrete does not overflow the hopper 210. Accordingly, the operator of the truck must control the truck's discharge hopper 150 to interrupt and resume discharge of concrete as needed in order to maintain a ready supply of concrete within the pump hopper 210, while preventing overfilling which will result in overflow and spillage of concrete.

Figure 2:
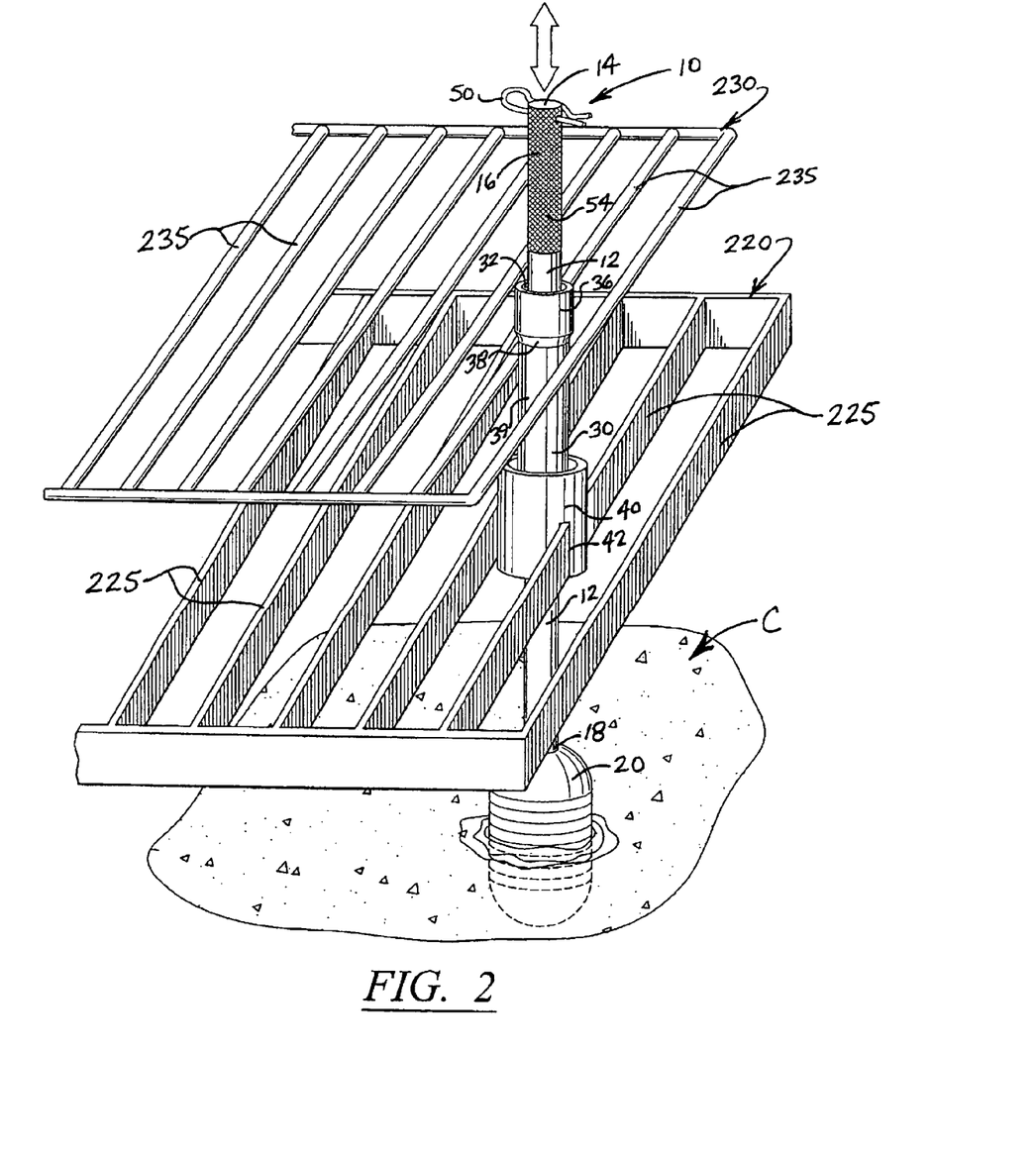
FIG. 2 is isolated top perspective view illustrating the concrete level indicator device of the present invention installed within the hopper of a concrete pump in accordance with a first preferred embodiment thereof, wherein two separator screens are used in the hopper.
Figure 3A:
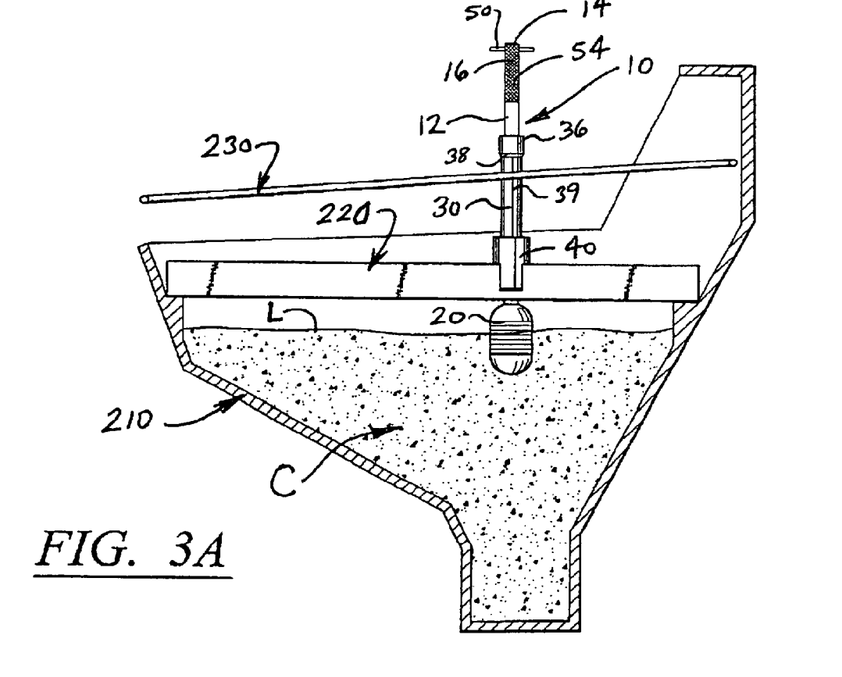
FIG. 3A is a side elevational view, in partial section, showing the concrete level indicator device of FIG. 2 installed in the hopper of a concrete pump, and wherein a visual indicator of the device is in a raised position to indicate that the concrete level in the hopper has reached full.
Figure 3B:
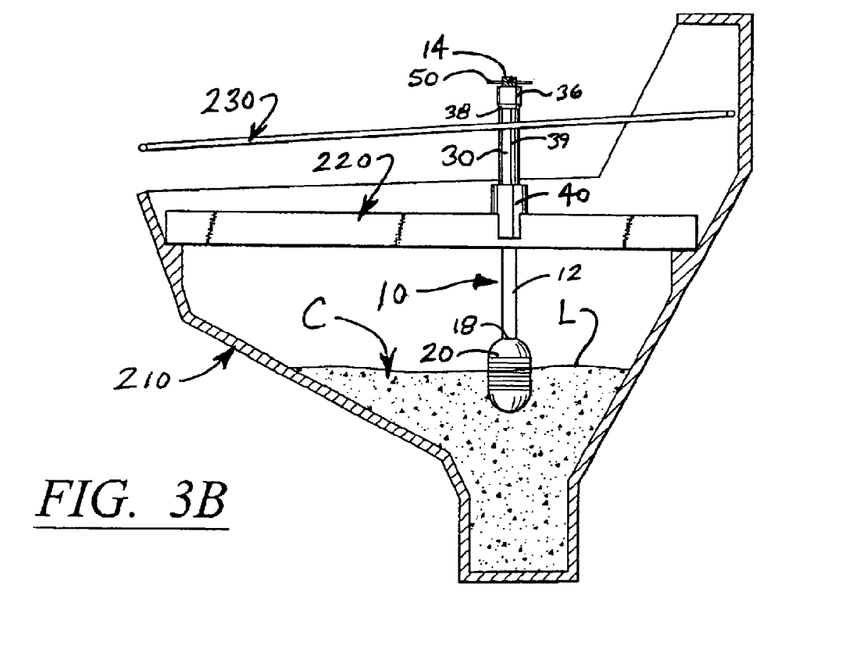
FIG. 3B is a side elevational view, in partial section, showing the concrete level indicator device of FIG. 2 installed in the hopper of a concrete pump, and wherein the visual indicator of the device is lowered and concealed from view to indicate a low concrete level within the hopper.

Referring to FIGS. 2–3B, a first preferred embodiment of the concrete level indicator device is shown and is generally indicated as 10. In this particular embodiment, the device 10 is adapted for use in the hopper 210 of the concrete pump when two separator screens are used. Specifically, a first separator screen 220 is normally positioned in the hopper 210, as seen in FIGS. 3A–3B. This first separator screen 220 is of a larger size, with spacing between parallel bars 225 arranged to prevent passage of larger rocks and other large chunks of debris therethrough and into the charge of concrete C within the hopper 210. In instances wherein it is desirous or necessary to remove smaller rocks and other smaller articles of debris, a second separator screen 230 is used. As seen in FIGS. 2–3B, the second separator screen 230 is positioned in spaced relation above the first separator screen 220 which normally remains within the hopper. As seen in FIG. 2, the spacing between the bars 235 on the second separator screen 230 is closer than the separation space between the bars 225 on the first separator screen 220.

The concrete level indicator device 10, as shown in FIGS. 2–3B, is structured to be supported by the two separator screens 220 and 230. The concrete level indicator device 10 includes an elongate post 12 having a top end 14 with an upper end zone 16 and a lower end 18. A float body 20 is fixed to the bottom end 18 of the post 12. The float body 20 is larger than the outer diameter of the post 12 and, in a preferred embodiment, has a generally bulbous configuration. While the preferred embodiment uses an air filled float body, other suitable buoyant structures and materials may be used. Naturally, due to the exposure to acids and other corrosive elements normally found in concrete mixtures, it is preferred that all of the components of the device 10, including the float body 20, be formed of non-corrosive, durable materials which can be easily rinsed clean after use in order to remove concrete and other materials which adhere to the surfaces of the device.

The float level indicator device 10 further includes a tubular guide sleeve 30. The tubular guide sleeve 30 is formed of a rigid material, such as PVC, and includes an open top 32 and an open bottom 34 (see FIG. 4), with a tubular passage therethrough sized and configured for sliding, telescopic receipt of the post 12 therethrough. An upper end 36 of the guide sleeve 30 is enlarged to form a shoulder 38 between the enlarged upper end 36 and the outer surface 39 of the remaining length of the guide sleeve 30. The enlarged upper end 36 is particularly sized to prevent passage through the spaced bars of the second screen 230. More specifically, when the guide sleeve 30 is dropped between two spaced bars 235 of the screen 230, the shoulder 38 engages the bars 235 to support the guide sleeve with the remaining lower length of the guide sleeve hanging down below the screen 230.

A retaining collar 40 is sized and configured to surround the outer surface 39 of the guide sleeve 30, in close, spaced relation thereto. The retaining collar 40 is provided with slots 42 to permit removable attachment of the retaining collar 40 to one of the bars 225 of the lower screen 220. As seen in FIGS. 2–3B, the guide sleeve 30 and post 12 extend through the retaining collar with the float body 20 resting within the top surface level L of the concrete C in the hopper. The retaining collar 40 limits swinging movement of the guide sleeve 30 which hangs down from the upper screen 230, and maintains the post 12 and guide sleeve 30 in a vertical, upright position. A clip 50 attached to the top end of the post 12 serves as a stop member to prevent passage of the top end through the open top of the guide sleeve, thereby preventing the post 12 from falling through the guide sleeve 30 and into the hopper, when the concrete C within the hopper is depleted and the level L of concrete drops towards the bottom of the hopper. Accordingly, the clip prevents separation of the post and float body from a remainder of the device when the concrete level drops.

Operation of the concrete level indicator device 10 is shown between a high concrete level condition in FIG. 3A and low concrete level condition in FIG. 3B. The upper end zone 16 of the post 12 is provided with a visual indicator. In a preferred embodiment, a bright red band 54 is applied to the upper end zone 16 of the post with the use of paint, tape or other well known materials. Alternatively, a flag or other visual indicator may be attached to the top end of the post 12. As seen in FIG. 3A, when the concrete level L in the hopper is full the float body 20 resting within the concrete surface urges the post 12 upwardly through the guide sleeve 30 until the entire upper end zone, having the visual indicator 54 is exposed and easily visible. In this position, as seen in FIG. 3A, the visual indicator 54 on the upper end zone of the post 12 is easily seen by the operator 110 in the truck 100, while viewing through the side view mirror 122, and within the line of sight indicated by the broken lines 125. Accordingly, when the operator 110 sees the visual indicator 54 (e.g. the red band) on the upper end zone 16 of the post 12, the operator immediately operates the controls within the cab to interrupt discharge of concrete into the hopper 210 of the concrete pump. The truck operator 110, always maintaining a watchful eye on the concrete pump hopper and indicator device 10 must then wait until the visual indicator 54 on the top of the post 12 is no longer visible. Naturally, as the concrete C is pumped from the hopper, the level L will drop, as seen in FIG. 3B. When the level L of the concrete C in the hopper drops, as shown, the float body 20 and post 12 move downwardly relative to the stationery guide sleeve 30 until the visual indicator 54 on the upper end zone 16 of the post is no longer visible, as seen in FIG. 3B. At this point, the truck operator 110 can reactivate discharge of concrete from the truck's discharge hopper 150 and into the concrete pump hopper 210 while always maintaining a watchful eye on the pump hopper 210 and concrete level indicator device 10.

Figure 4:
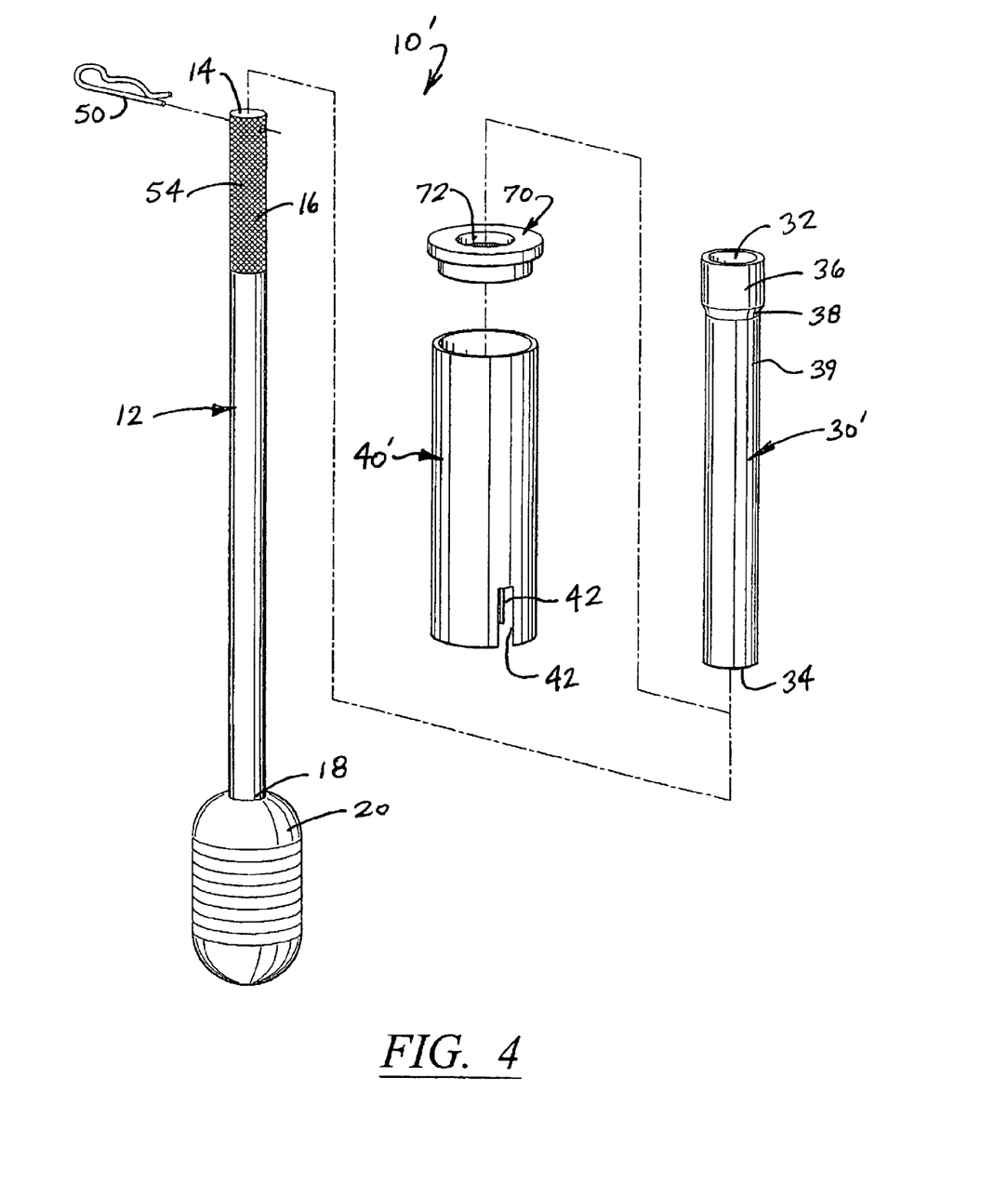
FIG. 4 is an exploded perspective view showing the component parts of the concrete level indicator, in accordance with a second preferred embodiment thereof.
Figure 5:
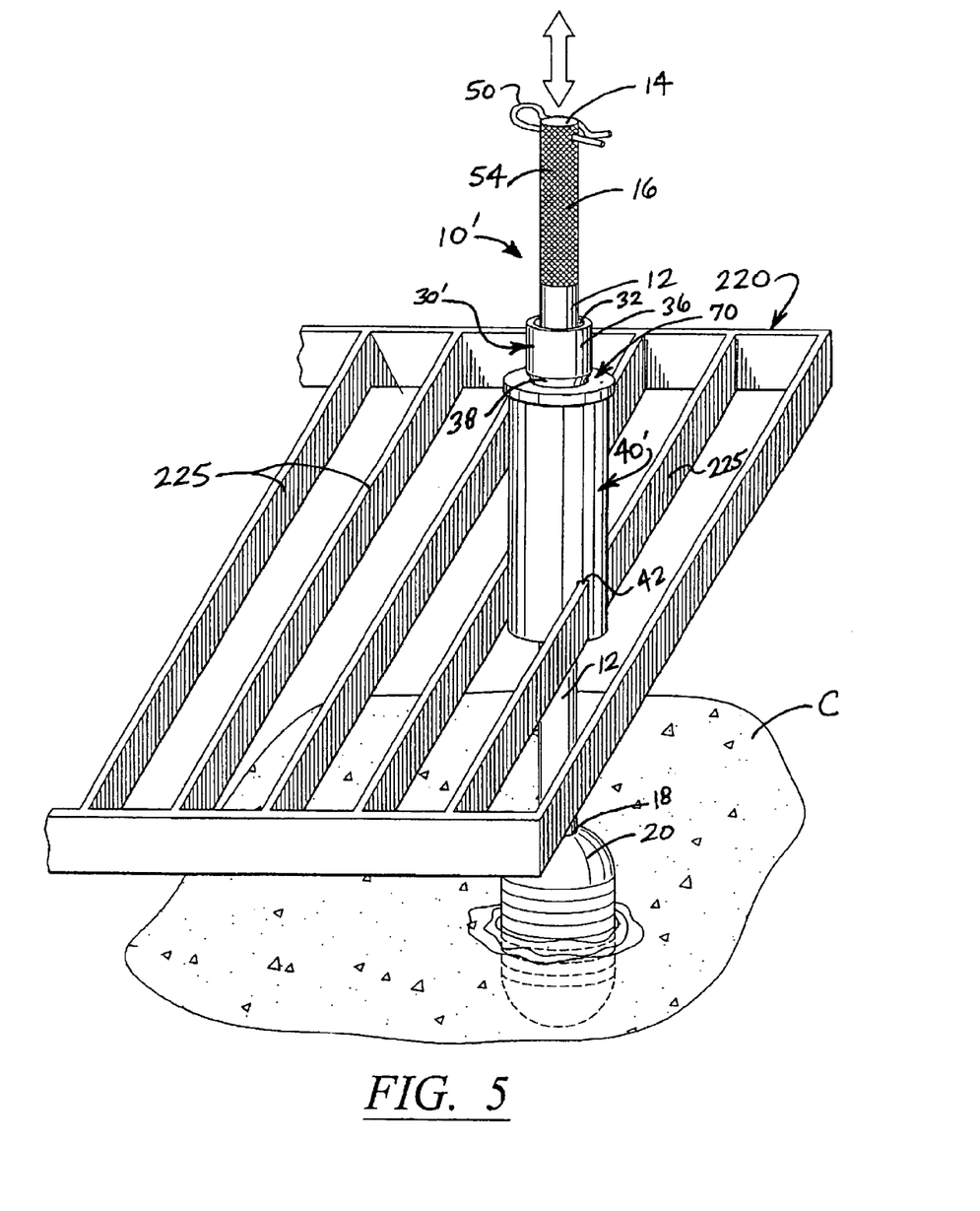
FIG. 5 is an isolated top perspective view showing the concrete level indicator of the second preferred embodiment installed within the hopper of a concrete pump, and wherein only a single separator screen is used within the hopper.

In instances wherein the upper screen 230 is not used, the guide sleeve 30 of the above-described embodiment has no means for hanging support. Accordingly, a second embodiment of the float level indicator is provided, as shown in FIGS. 4 and 5, and is generally indicated as 10'. In this particular embodiment, the post 12, float body 20 and clip 50 are the same as used the embodiment of FIGS. 2–3B. However, to support the device 10' on just the lower screen 220, a larger retaining collar 40' is provided. Similar to the first embodiment, the retaining collar 40' is provided with slots 42 for removable attachment of the retaining collar 40' to one of the bars 225 of the screen 220. A guide sleeve 30' is essentially the same as the guide sleeve provided in connection with the first embodiment and includes an open top 32 and bottom 34, an enlarged upper portion 36, and a shoulder 38 between the enlarged upper portion 36 and outer surface 39 of the remaining length of the guide sleeve 30'. However, in this particular embodiment, the guide sleeve 30' is shorter in overall length, as compared to the guide sleeve in the first embodiment. Additionally, a cap 70 removably attaches to the top end of the retaining collar 40'. The cap 70 includes a hole 72 therethrough which is sized and configured to permit passage of the smaller diameter portion 39 of the guide sleeve 39' (i.e. below the shoulder) therethrough, while the shoulder 38 of the guide sleeve 30' rests against the annular surface surrounding the hole 72, preventing passage of the enlarged upper portion 36 through the cap 70. In operation, the retaining collar 40' the guide sleeve 30' and post 12 in a vertical, upright position while preventing swinging movement of the guide sleeve 30' and post 12 relative to the screen 220. The cap 70 and retaining collar 40' further serve to support the guide sleeve 30' in fixed position, while allowing upward and downward telescoping movement of the post 12 as the concrete level L in the same hopper 210 changes. Visual indication of the concrete level L in the hopper 210 is achieved in the same manner as described in connection with the embodiment of FIGS. 2–3B.

While the instant invention has been shown and described in accordance with a preferred and practical embodiments thereof, it is recognized that departures from the instant disclosure are contemplated within the spirit and scope of the present invention as defined in the following claims.

What is claimed is:

1. A device for indicating the level of concrete within the hopper of a concrete pump, said device comprising:

an elongate post having an upper end zone with a top end and a lower end zone with a bottom end;

a float member fixed to said bottom end of said elongate post;

a tubular guide sleeve having an interior dimension sized and configured for allowing sliding, telescoping movement of said elongate post therethrough, and said guide sleeve being structured and disposed to be supported vertically above the concrete in the hopper to direct the sliding telescoping movement of said elongate post vertically up and down through a range of movement between a fully raised position and a fully lowered position; and a retaining collar attachable to the concrete pump, above the concrete in said hopper, said retaining collar being structured and disposed to surround said guide sleeve for limiting lateral movement of said guide sleeve and said elongate post, and thereby maintaining said guide sleeve and elongate post in an upright, vertically extending position; and said float member being structured and disposed for contacting the concrete and to move with the level of the concrete as the level of the concrete within the hopper changes, and thereby causing said upper end zone and said top end of said elongate post to move vertically relative to the concrete pump and said tubular guide sleeve and towards said fully raised position as the concrete level rises within the hopper, and towards said fully lowered position as the level of concrete within the hopper drops lower.

2. The device as recited in claim 1 further comprising:

a stop member on said upper end zone of said elongate post for limiting downward sliding telescoping movement of said elongate post relative to said guide sleeve so that said elongate post stops at the fully lowered position.

3. The device as recited in claim 2 wherein said stop member is structured and disposed for engaging a top end of said guide sleeve at said fully lowered position.

4. The device as recited in claim 1 further comprising:

a visual indicator on said upper end zone of said elongate post, said visual indicator being positioned and disposed to be visibly exposed above said guide sleeve when said elongate post is at said fully raised position, thereby visually indicating that the concrete in the hopper has reached a high level.

5. The device as recited in claim 4 wherein said visual indicator is a color band around said upper end zone of said elongate post.

6. The device as recited in claim 1 wherein said guide sleeve includes an enlarged upper end portion sized and configured to prevent passage between adjacent, parallel spaced bars of a first separator screen fitted to the concrete pump above the hopper so that said guide sleeve is supported with said enlarged end portion resting on the spaced parallel bars with a remaining portion of said guide sleeve hanging vertically below the first separator screen and extending downwardly towards the concrete in the hopper.

7. The device as recited in claim 6 wherein said retaining collar is structured for removable attachment to at least one bar of a second separator screen fitted to the concrete pump, below the first separator screen.

8. The device as recited in claim 1 wherein said guide sleeve includes an enlarged upper end portion forming an annular shoulder, and said retaining collar includes a top opening surrounded by a top annular surface sized and configured for engaging the annular shoulder on said guide sleeve so that said guide sleeve is vertically supported by said retaining collar above the concrete in the hopper.

9. The device as recited in claim 8 wherein said retaining collar is structured for removable attachment to at least one bar of a separator screen fitted to the concrete pump above the concrete in the hopper.

10. A device for indicating the level of concrete within the hopper of a concrete pump, said device comprising:

an elongate post having an upper end zone with a top end and a lower end zone with a bottom end;

a float member fixed to said bottom end of said elongate post;

a tubular guide sleeve having an interior dimension sized and configured for allowing sliding, telescoping movement of said elongate post therethrough, and said guide sleeve being structured and disposed to be supported vertically above the concrete in the hopper to direct the sliding telescoping movement of said elongate post vertically up and down through a range of movement between a fully raised position and a fully lowered position; and said float member being structured and disposed for contacting the concrete and to move with the level of the concrete as the level of the concrete within the hopper changes, and thereby causing said upper end zone and said top end of said elongate post to move vertically relative to the concrete pump and said tubular guide sleeve and towards said fully raised position as the concrete level rises within the hopper, and towards said fully lowered position as the level of concrete within the hopper drops lower.

11. The device as recited in claim 10 further comprising:

a stop member on said upper end zone of said elongate post for limiting downward sliding telescoping movement of said elongate post relative to said guide sleeve so that said elongate post stops at the fully lowered position.

12. The device as recited in claim 11 wherein said stop member is structured and disposed for engaging a top end of said guide sleeve at said fully lowered position.

13. The device as recited in claim 10 further comprising:

a visual indicator on said upper end zone of said elongate post, said visual indicator being positioned and disposed to be visibly exposed above said guide sleeve when said elongate post is at said fully raised position, thereby visually indicating that the concrete in the hopper has reached a high level.

14. The device as recited in claim 13 wherein said visual indicator is a color band around said upper end zone of said elongate post.

15. The device as recited in claim 10 wherein said guide sleeve includes an enlarged upper end portion sized and configured to prevent passage between adjacent, parallel spaced bars of a first separator screen fitted to the concrete pump above the hopper so that said guide sleeve is supported with said enlarged end portion resting on the spaced parallel bars with a remaining portion of said guide sleeve hanging vertically below the first separator screen and extending downwardly towards the concrete in the hopper.

16. A device for indicating the level of a substance being filled in a reservoir, said device comprising:

an elongate post having an upper end zone with a top end and a lower end zone with a bottom end;

a float member fixed to said bottom end of said elongate post;

a tubular guide sleeve having an interior dimension sized and configured for allowing sliding, telescoping movement of said elongate post therethrough, and said guide sleeve being structured and disposed to be supported vertically above the substance in the reservoir to direct the sliding telescoping movement of said elongate post vertically up and down through a range of movement between a fully raised position and a fully lowered position; and said float member being structured and disposed for contacting the substance and to move with the level of the substance as the level of the substance within the reservoir changes, and thereby causing said upper end zone and said top end of said elongate post to move vertically relative to the reservoir and said tubular guide sleeve and towards said fully raised position as the level of the substance rises within the reservoir, and causing said upper end zone and said top end of said elongate post to move towards said fully lowered position as the level of substance within the reservoir drops lower.

17. The device as recited in claim 16 further comprising:

a stop member on said upper end zone of said elongate post for limiting downward sliding telescoping movement of said elongate post relative to said guide sleeve so that said elongate post stops at the fully lowered position.

18. The device as recited in claim 17 wherein said stop member is structured and disposed for engaging a top end of said guide sleeve at said fully lowered position.

19. The device as recited in claim 16 further comprising:
a visual indicated on said upper end zone of said elongate post, said visual indicator being positioned and disposed to be visibly exposed above said guide sleeve when said elongate post is said fully raised position, thereby visually indicating that the substance in the reservoir has reached a high level.

20. The device as recited in claim 19 wherein said visual indicator is a color band around said upper end in zone of said elongate post.

* * * * *